US005439544A

United States Patent [19]

Bory

[11] Patent Number: 5,439,544

[45] Date of Patent: Aug. 8, 1995

[54] NO-CRUSH ROLL SYSTEM AND METHOD IN A DOUBLE BACKER

[75] Inventor: William H. Bory, Baltimore, Md.

[73] Assignee: Chesapeake Corporation, Baltimore, Md.

[21] Appl. No.: 122,943

[22] Filed: Sep. 20, 1993

[51] Int. Cl.$^6$ .......................... B30B 3/00; B31F 5/04; B32B 31/20

[52] U.S. Cl. .............................. 156/210; 100/93 RP; 100/153; 100/168; 156/470; 156/583.5; 384/901

[58] Field of Search ..................... 156/210, 470, 583.5, 156/324; 100/168, 93 RP, 153; 425/367, 373; 384/901

[56] References Cited

U.S. PATENT DOCUMENTS

| | | | |
|---|---|---|---|
| 3,607,523 | 9/1971 | McGirr | 156/210 |
| 4,470,592 | 9/1984 | Takahashi . | |
| 4,579,465 | 4/1986 | Horner | 384/901 X |
| 4,716,435 | 12/1987 | Wilson | 100/93 RP X |
| 4,829,645 | 5/1989 | Kannwischer . | |
| 4,958,829 | 9/1990 | Ward, Jr. . | |
| 4,966,360 | 10/1990 | Pawlowski . | |
| 4,990,003 | 2/1991 | Jingu et al. . | |
| 5,029,845 | 7/1991 | Simpson-Davis . | |
| 5,137,270 | 8/1992 | Sloan . | |

FOREIGN PATENT DOCUMENTS

| | | | |
|---|---|---|---|
| 5-133415 | 5/1993 | Japan | 384/901 |

*Primary Examiner*—Michele K. Yoder

*Attorney, Agent, or Firm*—Lowe, Price, LeBlanc & Becker

[57] ABSTRACT

A no-crush roll system for attaining zero crush across the double backer in a corrugator is disclosed which is retrofittable to most existing machines. The no-crush roll system includes a series of pairs of bearing adapters each formed with a pin received in an overhead support frame with a bearing support cup located at inwardly extending ends of the pin to receive a bearing mounted to opposite ends of the roller. Each bearing is received in an elongate cavity facing the roller which permits the height of the roller to self adjust in response to changes in thickness of the cardboard material being conveyed along a hot plate as the weight of the rollers pressing against the top surface of the cardboard ensure even glue distribution and curing contact without crushing the material. A method of eliminating crush in a double backer of a corrugator is also disclosed.

14 Claims, 5 Drawing Sheets

Fig. 5
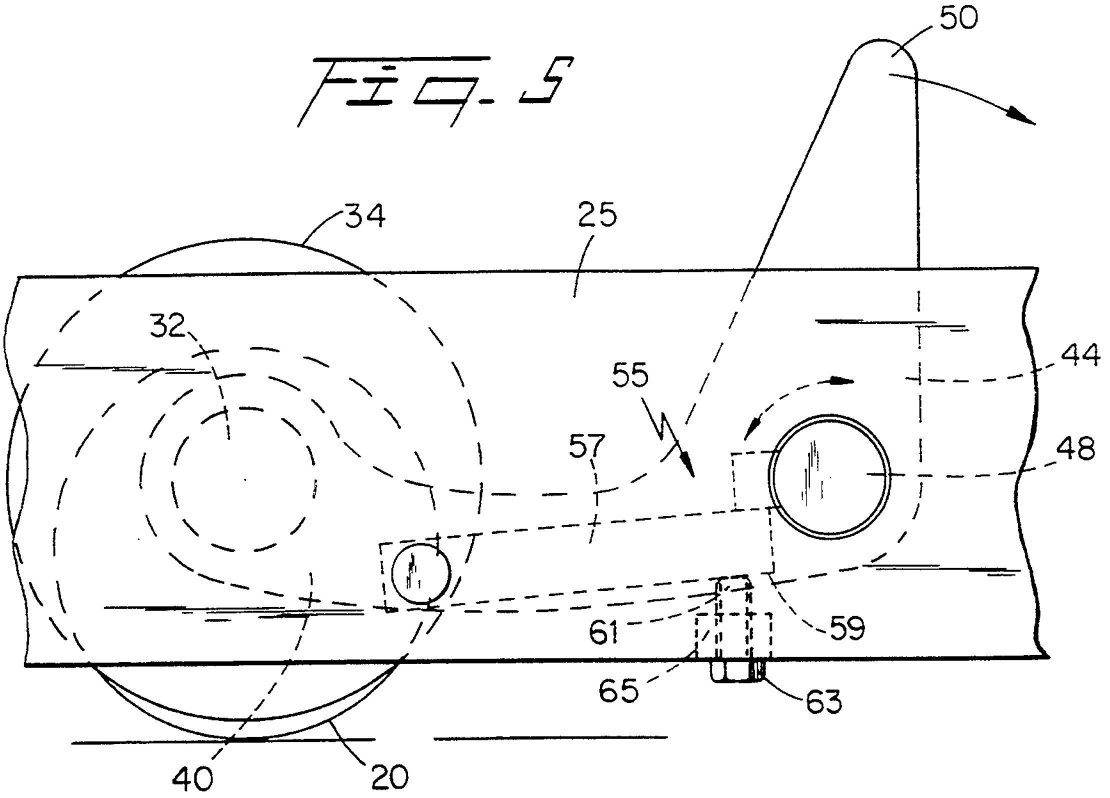
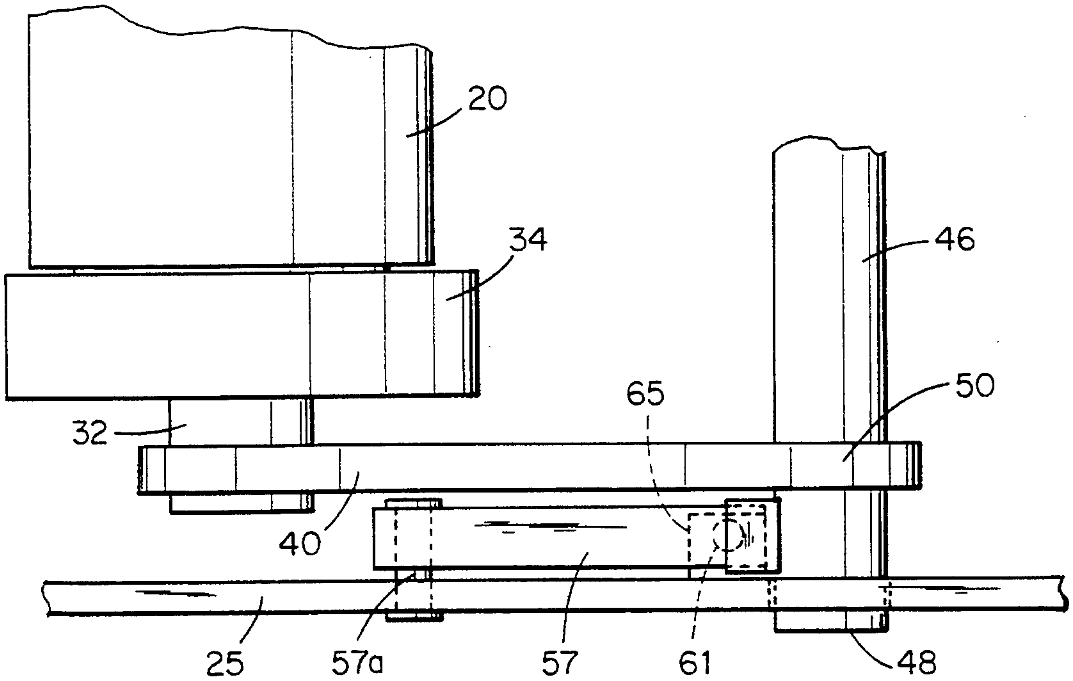
Fig. 6

NO-CRUSH ROLL SYSTEM AND METHOD IN A DOUBLE BACKER

TECHNICAL FIELD

The present invention relates generally to the manufacture of corrugated cardboard and, more particularly, to a roller system for attaining substantially zero crush across a double backer in a corrugator.

BACKGROUND ART

Typically, corrugated cardboard panels are comprised of two flat outer sheets and an internal corrugated liner sheet which spaces the two outer sheets apart and defines the overall thickness of the cardboard. Together, these outer sheets and the corrugations or undulations in the internal sheet define a series of "flutes" which are parallel linear passages or tunnels adding strength and rigidity to the panel structure.

The outer sheets and the internal sheet are glued together in a machine commonly known as a corrugator that is well known in the art and comprises a series of stations which respectively perform a variety of functions, e.g., lay up of the outer sheets with the internal sheet, application of a starch based glue to the sheets which are then arranged in a sandwich form, etc. After the sandwich is formed, the corrugated cardboard is passed over a hot plate in what is known as a double backer section of the corrugator. The bottom outer sheet rides on the hot plate and the sandwich is pulled along by means of an overhead endless belt engaging the top outer sheet. The hot plate extends the full width of the panel and along a predetermined length thereof to properly dry and cure the glue.

To ensure an even distribution of glue, the panel runs under a plurality of parallel steel rollers which are longitudinally spaced from each other to apply a hold-down force against the panel by exerting their weight through the belt against the top outer sheet. In prior art double backer systems of which I am aware, the rollers extend between a pair of parallel side frames and are respectively mounted, via bearings at opposite ends thereof, to a pair of pivotal support arm assemblies connected to the side frames. The support arms are controlled to mechanically or manually move the rollers between upper and lower positions. In the lower position, the rollers ride on the top outer sheet in the manner described above. However, if one or more of these rollers is off center, e.g., which may be caused by a gradual buildup of glue at one or both bearings, then the roller surface will no longer be parallel to the panel surface and will likely exert a crushing force against the panel. This crushing force will either adversely affect the strength of the panel or result in a crease in the panel, either occurrence requiring the panel to be discarded as scrap.

It is accordingly one object of the present invention to provide a roller system in a double backer which does not exert a crushing force against the cardboard panel being manufactured.

Another object is to provide a roller system which is self-adjusting to maintain parallelism between the roller surfaces and the cardboard panel.

Yet another object is to provide a roller system which automatically adjusts its position to exert a substantially uniform downward clamping force against the cardboard panel along the entire width of the panel.

Yet another object is to provide a no-crush roller system in which self-adjustment occurs as a result of eccentric bearing mounts rotatably supporting opposite ends of each roller.

SUMMARY OF THE INVENTION

A conveyorized arrangement for transporting a multiple layer material, in accordance with the present invention, comprises a bottom support upon which the material is supported and a plurality of overhead rollers extending transversely above the material in longitudinally spaced relation to each other while supported with an overhead support frame. Bearing arrangements are provided for rotatably supporting substantially each roller on the support frame so that the weight of the roller presses the material. Each said bearing arrangement is mounted in a free-floating relationship to the overhead support frame to prevent the rollers from crushing the material.

The conveyorized arrangement is preferably a double backer in a corrugator assembly and the multiple layer material is preferably corrugated cardboard having a pair of outer sheets and an internal corrugated liner sheet glued thereto and which spaces the two outer sheets apart to define the overall thickness of the cardboard. The bottom support includes a hot plate on which the cardboard is disposed in glue curing contact. An overhead conveyor conveys the cardboard along the hot plate.

In a preferred embodiment of this invention, the overhead conveyor is a driven belt in contact with the top outer sheet and the rollers contact the cardboard through the belt. There is further provided a pair of support arms pivotally attached to the support frame. A pair of the bearing arrangements are respectively mounted to the support arms to receive bearings mounted at the opposite ends of the associated roller. Means is provided for pivoting the support arms and the roller between an upper clearance position, i.e., out of pressure contact with the material, and a lower operating position whereby substantially only the floating weight of the roller presses against an upper surface of the material. In this manner, the glue is evenly distributed along the width of the material without crushing it to thereby ensure a high quality product.

Each bearing arrangement preferably includes a bearing adapter having a pin received in the corresponding support arm and a bearing support cup facing towards the roller to receive the bearing attached to an associated end of the roller. The cup includes an elongate bearing support cavity which receives the bearing and permits it to freely move within the cavity in a direction generally perpendicular to the upper surface of the material to allow the free-floating relationship to occur.

The bearing is preferably a roller bearing and the cavity has rounded opposite ends defined by a radius of curvature at least equal to the radius of the outer surface of the bearing. Further, the cavity is arranged so that the roller, supported by the bearings within the cavities, remains at a fixed longitudinal location relative to the conveyor path while retaining the ability to float in a direction perpendicular to the material surface.

In accordance with another feature of the present invention, an adjustment stop arrangement is provided for setting an operating height of the rollers so as to correspond with a predetermined thickness of material moving along the conveyorized arrangement. When the rollers are moved to the operating height as determined by the adjustment stop arrangement, they retain the ability to freely float during pressure contact with the material.

More specifically, the adjustment stop arrangement preferably includes a stop bar mounted to the pivot shaft preferably to an end of the shaft projecting outwardly from one of the side frames. The stop bar is thus co-rotatable with the pivot shaft. A lower surface of the stop bar is adapted to contact the upper end of an adjustment screw which projects vertically upward from a screw support secured to an outer vertical surface of the side frame and, in this manner, engagement of the stop bar against the screw during lowering of the rollers to operating position thereby serves to set the operating height of the rollers.

Identical adjustment stop arrangements may be provided in opposite ends of the pivot shaft if desired.

The free-floating bearing arrangements according to the present invention advantageously provide an inexpensive means for preventing cardboard from being crushed in a double backer of a corrugator assembly while providing the necessary pressure contact to ensure proper glue curing. Furthermore, the invention is easily retrofittable to the support frame of existing double backers in that it is substantially only necessary to mount the bearing adapter pins in the side frames to provide free-floating bearing support for the bearings disposed at the opposite ends of the rollers. Such retrofits to existing framework may be easily installed by plant personnel for a savings in time and money. The invention also avoids the high cost associated with maintaining ballast roll bearings and virtually eliminates the double backer as a source of crush with no air, electric, or hydraulics needed to operate the no-crush roll system of this invention.

A method of eliminating crush in a double backer of a corrugator used in the manufacture of corrugated cardboard having a pair of outer sheets and a corrugated internal sheet glued between the outer sheets is also within the scope of this invention. The method comprises the steps of conveying the cardboard along a bottom support within the double backer while applying pressure against the upwardly exposed surface of the cardboard through a series of overhead rollers mounted to a support frame through bearings. The pressure being exerted corresponds to the weight of the rollers since the weight of the rollers is preferably solely carried by the cardboard. In accordance with this invention, the pressure exerted against the cardboard cannot exceed the weight of the roller across substantially the entire length of the roller since the bearings are allowed to float in relation to the support frame so that the elevation of the roller along its length can self adjust in response to changes in thickness of the cardboard.

Still other objects and advantages of the present invention will become readily apparent to those skilled in this art from the following detailed description, wherein only the preferred embodiments of the invention are shown and described, simply by way of illustration of the best mode contemplated of carrying out the invention. As will be realized, the invention is capable of other and different embodiments, and its several details are capable of modifications in various obvious respects, all without departing from the invention. Accordingly, the drawing and description are to be regarded as illustrative in nature, and not as restrictive.

BRIEF DESCRIPTION OF DRAWINGS

FIG. 5 is a partly schematic, sectional view of an adjustment stop arrangement; and FIG. 6 is a top view of the stop arrangement of FIG. 5.

BEST MODE FOR CARRYING OUT THE INVENTION

Figure 1:
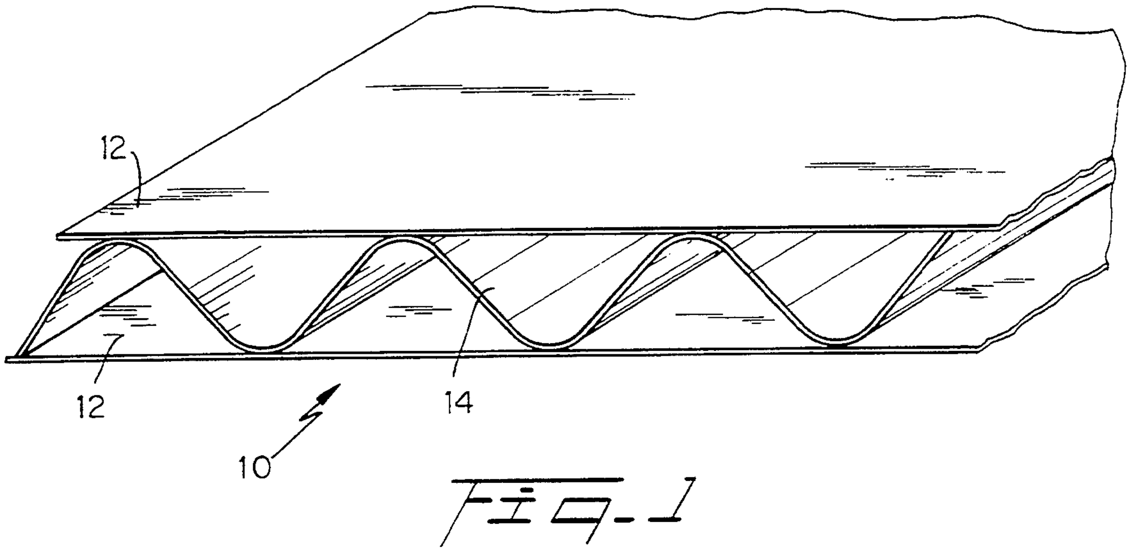
FIG. 1 is a partial perspective view of a corrugated cardboard panel manufactured in a double backer using the no-crush roll system of this invention.
Figure 2B:
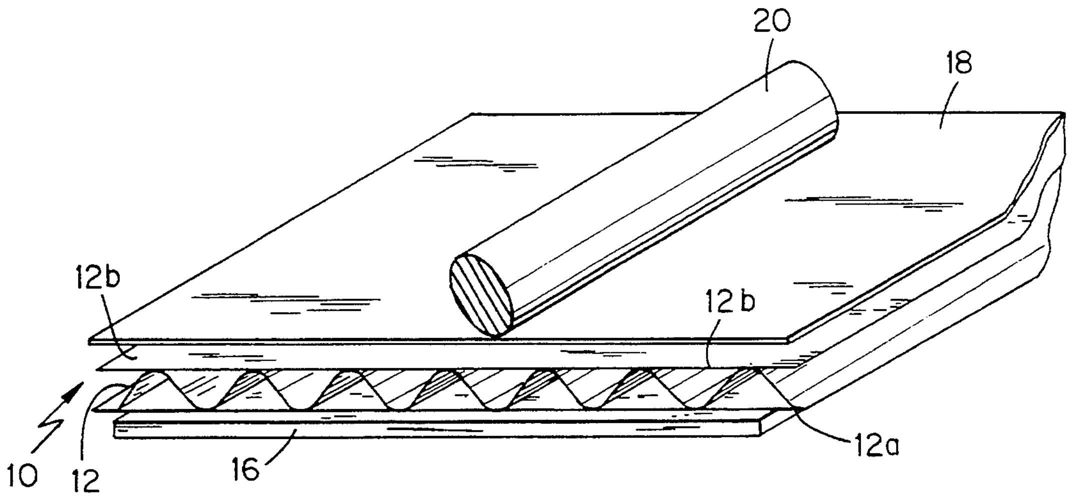
FIG. 2B is a perspective view, partly schematic, depicting the relative placement of the cardboard between a hot plate and the overhead conveyor no crush roll system of this invention.

The present invention is primarily concerned, but not limited to, the elimination of the double backer D as a source of crush in a corrugator system for manufacturing cardboard panels. A typical corrugated cardboard panel 10, as depicted in FIG. 1, is comprised of two flat outer sheets 12 and an internal corrugated liner sheet 14 which spaces the two outer sheets apart and defines the overall thickness of the cardboard. These outer sheets 12 and the corrugated liner 14 are formed and laid up at other stations within the corrugator as is well known. The outer sheets 12 and the internal liner sheet 14 are glued together with a starch based glue also in a known manner. After this "sandwich" is formed, the corrugated cardboard 10 is passed over a-hot plate 16 in the double backer D. As depicted in FIG. 2B, hot plate 16 extends the full width of the panel 10 and along a predetermined length thereof to both provide bottom support for the panel and to properly dry and cure the glue. The bottom surface **12*a* of the lower outer sheet 12 is in smooth sliding contact with the heated upper surface of the hot plate 16 and the cardboard 10 is driven therealong by means of an overhead endless belt 18 in driving contact with the top surface 12*b*** of the upper outer sheet as is well known.

To ensure an even distribution of glue, the panel 10 runs under a plurality of parallel steel rollers 20 which are longitudinally spaced from each other to exert a downward clamping force against the upper outer sheet **12*b* through the belt 18. This downward force corresponds to the weight of the roller 20 which is selected to provide as much pressure as possible against the cardboard 10 during the glue curing process without crushing the cardboard. Unfortunately, in prior art systems of which I am aware, the rollers tend to become slightly canted after a period of time due to wear or dirt lodging in the bearings. Also, the thickness of the cardboard 10 can vary along the length of a particular run. Consequently, the glue will not be evenly applied and, in extreme cases, the end of the roller canted downward can create a continuous crease the upper surface 12***b* of the cardboard.

Figure 2A:
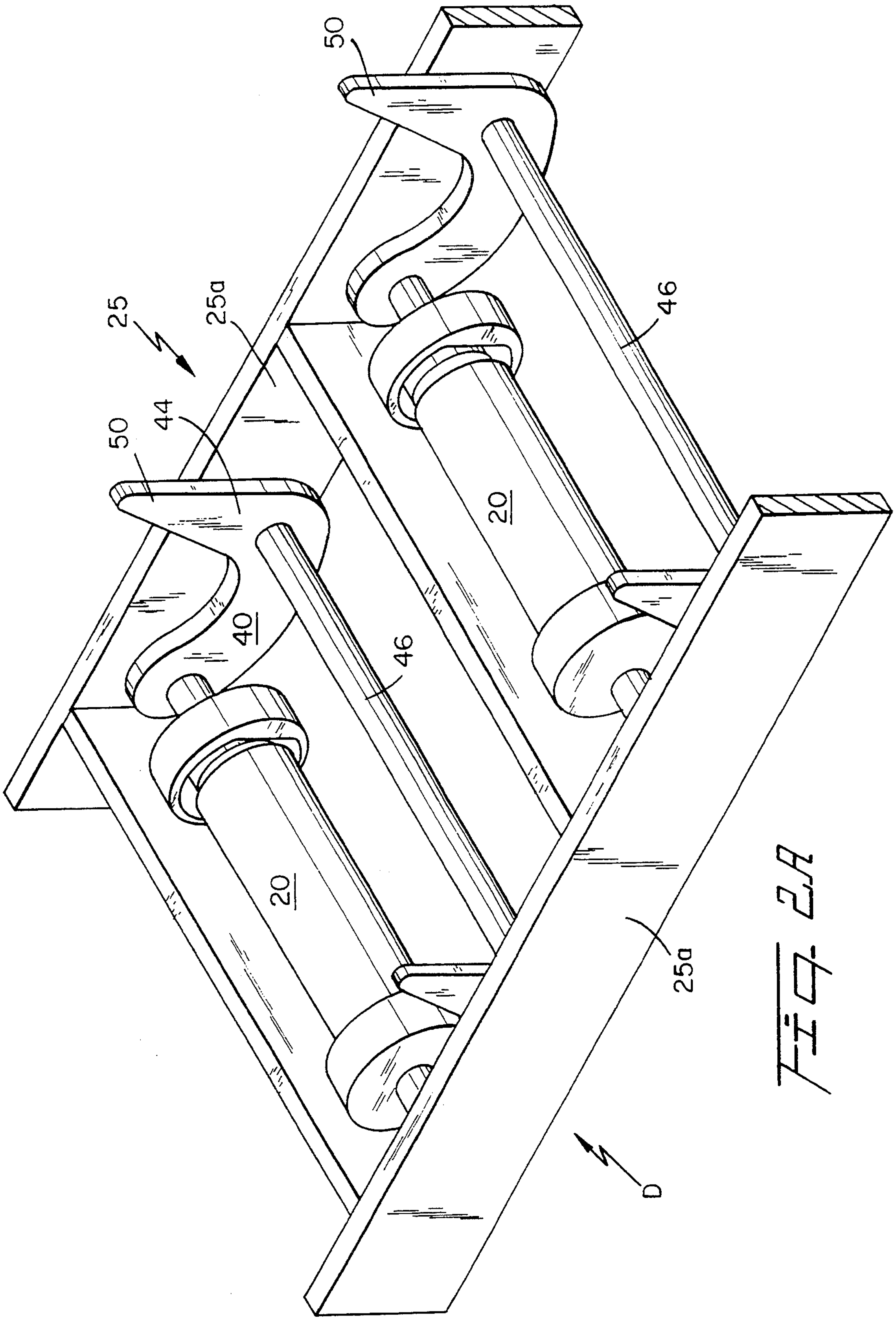
FIG. 2A is a perspective view depicting various structural specifics of the rollers and support frame in accordance with this invention.

To overcome the foregoing problems in a cost effective manner, the present invention features a no-crush roll system comprised of a conventional cylindrical steel roller 20 with conventional roller bearings 22 mounted at reduced diameter opposite ends 24 thereof as best depicted in FIGS. 3A–3C and 4. With reference to FIG. 2A, these rolls 20 extend between a pair of parallel side frames 25 at longitudinally spaced intervals from each other above the hot plate 16 schematically depicted in FIG. 2B so that each outer cylindrical roller surface bears against the top surface 12*b* of the upper outer sheet through belt 18 under the weight of the roller.

Figure 3A:
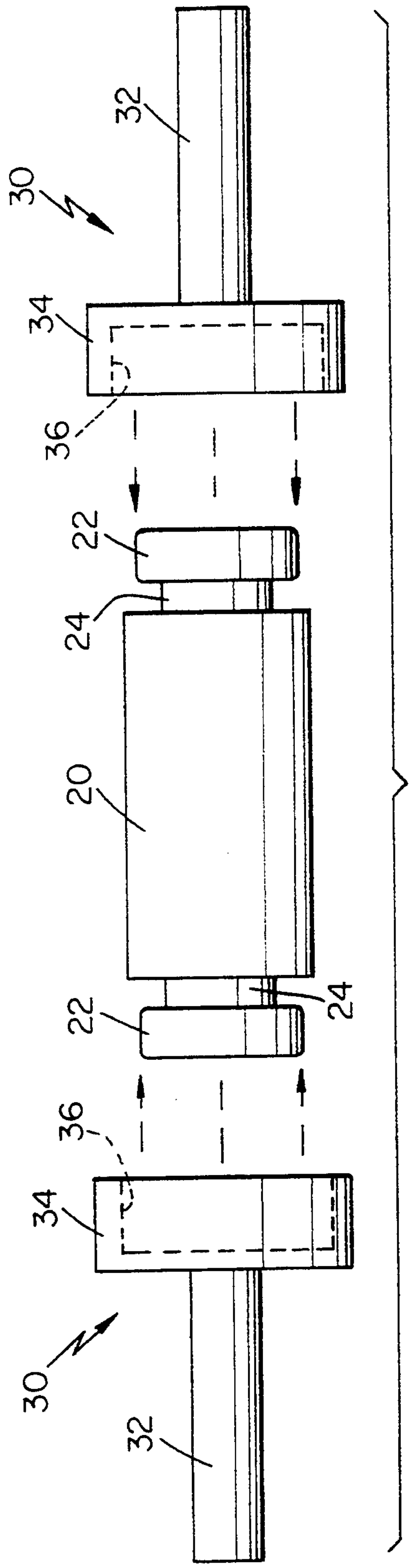
FIG. 3A is a front elevational view depicting structurally specific features of the bearing adapters according to this invention.
Figure 3C:
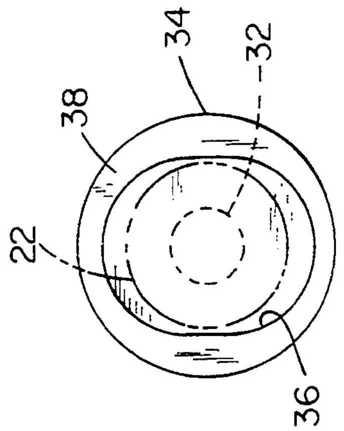
FIG. 3C is a view similar to FIG. 3B but depicting the bearing within one of the bearing adapters.
Figure 3B:
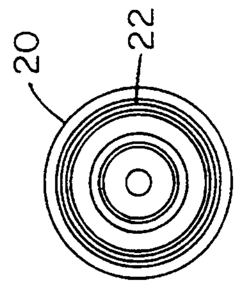
FIG. 3B is an end elevational view of a roller bearing.
Figure 4:
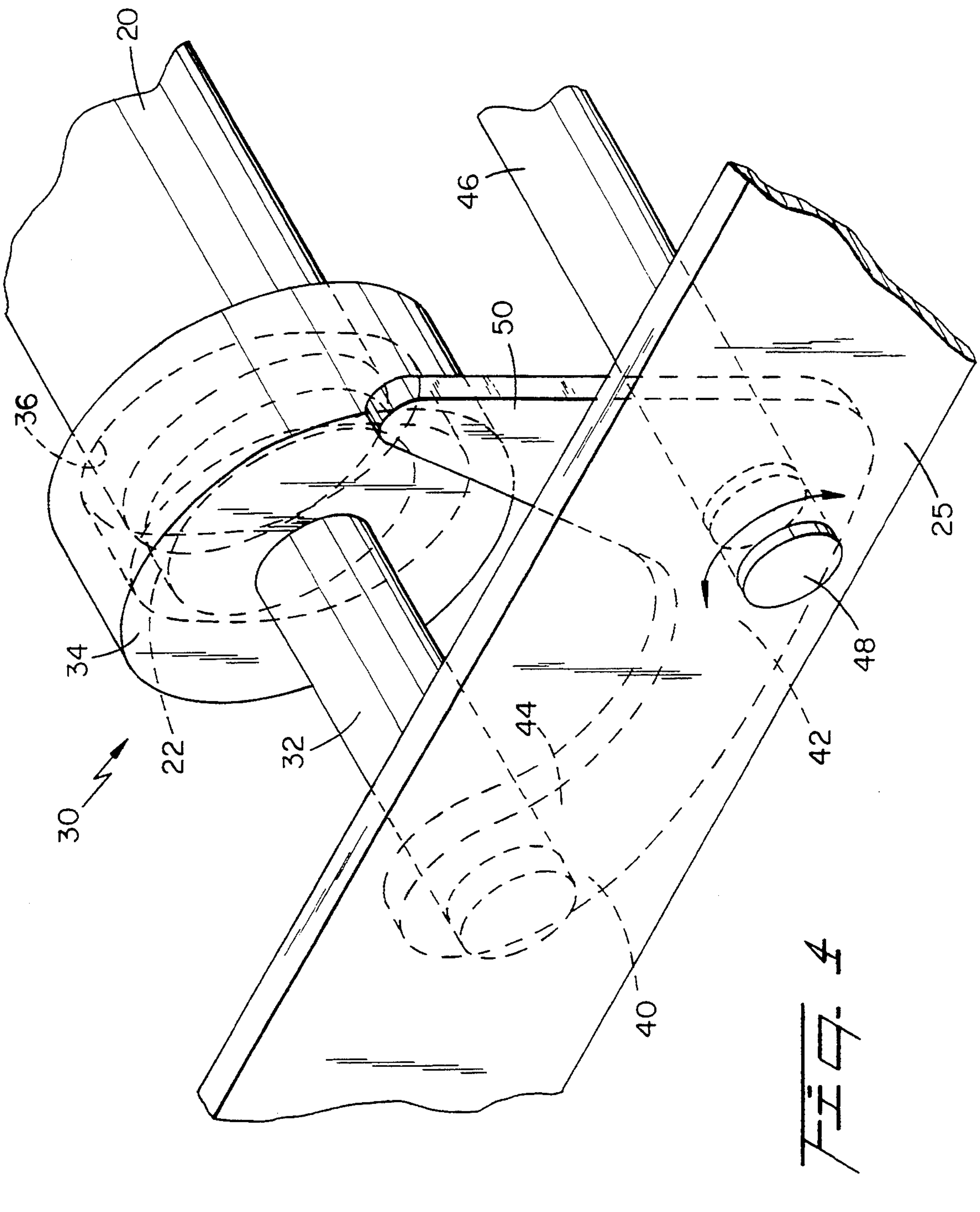
FIG. 4 is an enlarged perspective view depicting the bearing adapter and free-floating elements used in the roll system of this invention.

As best depicted in FIGS. 2A, 3C and 4, each roll bearing 22 is respectively received within a bearing adapter 30 having a cylindrical elongate mounting pin 32 pivotally mounted to the associated side frame 25 in the unique manner described below so that corresponding bearing adapters are in coaxial alignment with each other. These bearing adapters 30 do not rotate. The inwardly extending end 34 of each adapter 30 carries a bearing support cup formed with an elongate cavity 36 in the vertically inwardly extending face 38 thereof. This cavity 36 is elongated in the vertical direction (i.e., perpendicular or at an acute angle to the plane of upper cardboard surface 12*b*) and is rounded at its opposite top and bottom ends with a radius of curvature preferably corresponding to the radius of the outer bearing 22 received in the cavity 36. When the rollers 20 are suspended in operating position as described more fully below, the bearing adapters 30 permit the bearings 22 to freely float within the cavities 36 so that the weight of the roll 20 acts directly on the corrugated cardboard 10 through the belt 18 or via actual pressing engagement of the rolls against the upper cardboard surface if some other type of drive is utilized. Advantageously, therefore, the opposite ends 24 of each roll 20 are free to move vertically as a result of the free-floating relationship between the bearings 22 and the adapter cavities 32 enabling the longitudinal axis of the roller to elevationally tilt relative to the bearing supports to thereby prevent a crushing force from being applied by the roller against the cardboard 10.

With reference to FIGS. 2A and 4, each roll 20 is preferably mounted to side frames 25 through its associated pair of bearing adapters 30 which are respectively secured to the distal ends 42 of a pair of support arms 40 located in parallel inwardly spaced relation to the vertical interior surface 25*a* of the side frames. More specifically, the proximal end 44 of each curved support arm 40 is mounted to one of the opposite ends of a pivot shaft 46 for co-rotation with the pivot shaft. Ends 48 of the pivot shaft 46 projecting outwardly from the support arms 40 are rotatably received in the side frames 25. These ends 48 also carry upwardly extending actuator arms 50 which are mechanically or manually rotated to collectively pivot the rollers 20 through pivoting movement of the support arms 40 about shaft 46, between a lower operating position (FIG. 2B) and a raised, rest position (FIG. 4).

In accordance with another feature of this invention, the lower operating position of the rollers 20 is defined by a stop adjustment mechanism 55, depicted in FIGS. 5 and 6, which is comprised of a stop bar 57 mounted at one end thereof to a portion of pivot shaft end 48 projecting laterally outwardly from side frame 25. The stop bar 57 is thus co-rotatable with pivot shaft 46. The distal end of stop bar 57 has a lower surface 59 which rests upon the upper end 61 of a vertically extending adjustment screw 63 mounted to a screw support 65 extending outwardly from the side frame 25. The screw support 65 may be secured to the outer vertical surface of side frame 25 with screws 67 (FIG. 5). The elevational height of the stop bar 57 is controlled via movement of the adjustment screw 63. When pivoted into the operating position depicted in FIGS. 2B and 5, the adjustable elevation of upper screw end 61 will control, via contact with the lower surface 59 of stop bar 57, the operating height of rollers 20. In this manner, the operating height of the rollers 20 can be adjusted so as to accommodate different cardboard thickness in relation to different production runs.

Optionally, identical stop adjustment mechanisms 55 may be provided at both ends of pivot shaft 46 projecting outward from side frames 25.

It will be readily seen by one of ordinary skill in the art that the present invention fulfills all of the objects set forth above. After reading the foregoing specification, one of ordinary skill will be able to effect various changes, substitutions of equivalents and various other aspects of the invention as broadly disclosed herein. It is therefore intended that the protection granted hereon be limited only by the definition contained in the appended claims and equivalents thereof.

I claim:

1. A conveyorized arrangement for transporting a multiple layered material along a plane of conveyorized movement, comprising:

(a) a bottom support upon which the material is supported and is conveyed therealong;

(b) a plurality of overhead rollers extending transversely above the material in longitudinally spaced relation to each other;

(c) an overhead support frame for supporting the rollers above the material; and (d) bearing arrangements for rotatably supporting substantially each roller on said support frame so that the weight of the roller presses the material, each said bearing arrangement including a bearing attached to an associated end of the roller and a bearing support receiving said bearing, each said bearing being vertically movable along its associated bearing support to thereby enable the longitudinal axis of the roller to elevationally tilt, relative to the bearing supports, thereby enabling said bearings and said roller to be mounted in a free-floating relationship to the overhead support frame to prevent said rollers from crushing the material.

2. The conveyorized arrangement of claim 1, wherein said conveyorized arrangement is a double backer in a corrugator assembly and said multiple layer material is corrugated cardboard having a pair of outer sheets and an internal corrugated liner sheet glued thereto and which spaces the two outer sheets apart and defines the overall thickness of the cardboard and means for conveying said material along the bottom support.

3. The conveyorized arrangement of claim 2, wherein said bottom support includes a hot plate on which the cardboard is disposed in glue curing contact, and further including an overhead conveyor for conveying the cardboard along the hot plate.

4. The conveyorized arrangement of claim 3, wherein said overhead conveyor is a driven belt in contact with the top outer sheet and said rollers contact the cardboard through the belt.

5. The conveyorized arrangement of claim 1, further including a pair of support arms pivotally attached to the support frame and wherein a pair of said bearing supports are respectively mounted to the support arms to receive the bearings at opposite ends of the associated roller, respectively; and means for pivoting the support arms and the roller between an upper clearance position out of pressure contact with the material and a lower operating position whereby substantially only the floating weight of the roller presses against an upper surface of the material.

6. The conveyorized arrangement of claim 5, wherein each bearing arrangement includes a bearing adapter having a pin received in said support frame and a bearing support cup facing toward the roller to receive a bearing attached to an associated end of the roller, said cup including an elongate bearing support cavity which receives the bearing and permits it to freely move within the cavity to allow for said free-floating relationship.

7. The conveyorized arrangement of claim 6, wherein said bearing is a roller bearing and a radius of curvature at opposite ends of the cavity corresponds to the radius of the outer surface of said bearing.

8. The conveyorized arrangement of claim 7, wherein said cavity elongation is generally perpendicular to the plane of conveyorized movement of the material.

9. The conveyorized arrangement of claim 5, further comprising an adjustment stop arrangement mounted to the support frame for setting an operating height of the rollers so as to correspond with a predetermined thickness of material while enabling the rollers to freely flow during pressure contact with the material.

10. The conveyorized arrangement of claim 9, wherein a corresponding pair of support arms are interconnected to each other through a pivot shaft.

11. The conveyorized arrangement of claim 9, wherein said adjustment stop arrangement includes a stop bar mounted to the pivot shaft for co-rotation therewith, an end of said stop bar being engageable with an adjustment screw during lowering of said rollers as a result of rotation of said pivot shaft, whereby said adjustment screw upon contacting the stop bar serves to terminate rotation of the pivot shaft to thereby set operating height of said rollers.

12. The conveyorized arrangement of claim 10, wherein a corresponding pair of support arms are interconnected to each other through a pivot shaft upon which the stop lug is formed.

13. A method of eliminating crush in a double backer of a corrugator used in the manufacture of corrugated cardboard having a pair of outer sheets and a corrugated internal liner sheet glued between said outer sheets, comprising the steps of:

(a) conveying the cardboard along a bottom support within the double backer;

(b) applying pressure against an upwardly exposed surface of the cardboard through a series of overhead rollers mounted to a support frame through bearings connected to said support frame, said pressure corresponding to the weight of the rollers; and (c) maintaining said pressure so that it does not exceed the weight of the roller across substantially the entire length of the roller by allowing the bearings to float in relation to the support frame so that the elevation of the roller along its length can self adjust in response to changes in thickness of the cardboard through height adjustment movement of one or both ends of the roller relative to the associated bearing's point of connection to said support frame.

14. The method of claim 12, wherein an existing double backer is retrofitted by mounting a series of pairs of bearing adapters to the support frame so that elongate cavities formed in a bearing support cup of each adapter is oriented to receive the associated bearing at the opposite end of the associated roller, the elongation permitting the bearing to move in a direction substantially perpendicular to the surface of the material during conveyance through the double backer.

* * * * *